United States Patent [19]

LeGuin

[11] Patent Number: 5,664,949

[45] Date of Patent: Sep. 9, 1997

[54] COUPLER FOR USE IN THE SENSOR HEAD OF A MEASURING DEVICE

[76] Inventor: Hermann LeGuin, Ravensburger Str. 28, D-88279, Amtzell, Germany

[21] Appl. No.: 501,409

[22] Filed: Jul. 12, 1995

[30] Foreign Application Priority Data

Jul. 23, 1994 [DE] Germany ............... 44 26 171.3

[51] Int. Cl.⁶ ................................................. H01R 39/00
[52] U.S. Cl. .................................... 439/22; 439/936
[58] Field of Search ................................ 439/13, 17, 19, 439/22, 27, 29, 30, 700, 824, 936

[56] References Cited

U.S. PATENT DOCUMENTS 1,720,619   7/1929   Baldwin ........................... 439/29

FOREIGN PATENT DOCUMENTS 562535   9/1993   European Pat. Off. .
2243034  10/1991  United Kingdom ............ 439/700

Primary Examiner—Gary F. Paumen
Attorney, Agent, or Firm—Bachman & LaPointe, P.C.

[57] ABSTRACT

A coupler having an adapter element detachably held between a support member and a closure element. The support member defines an opening for receiving a connecting plug which feeds current to first spring pin. The connecting plug is provided with an opening for receiving a connecting pin for feeding current to a second spring pin. An insulating material is provided between the pin and the connecting plug and the connecting plug and support member respectively.

6 Claims, 1 Drawing Sheet

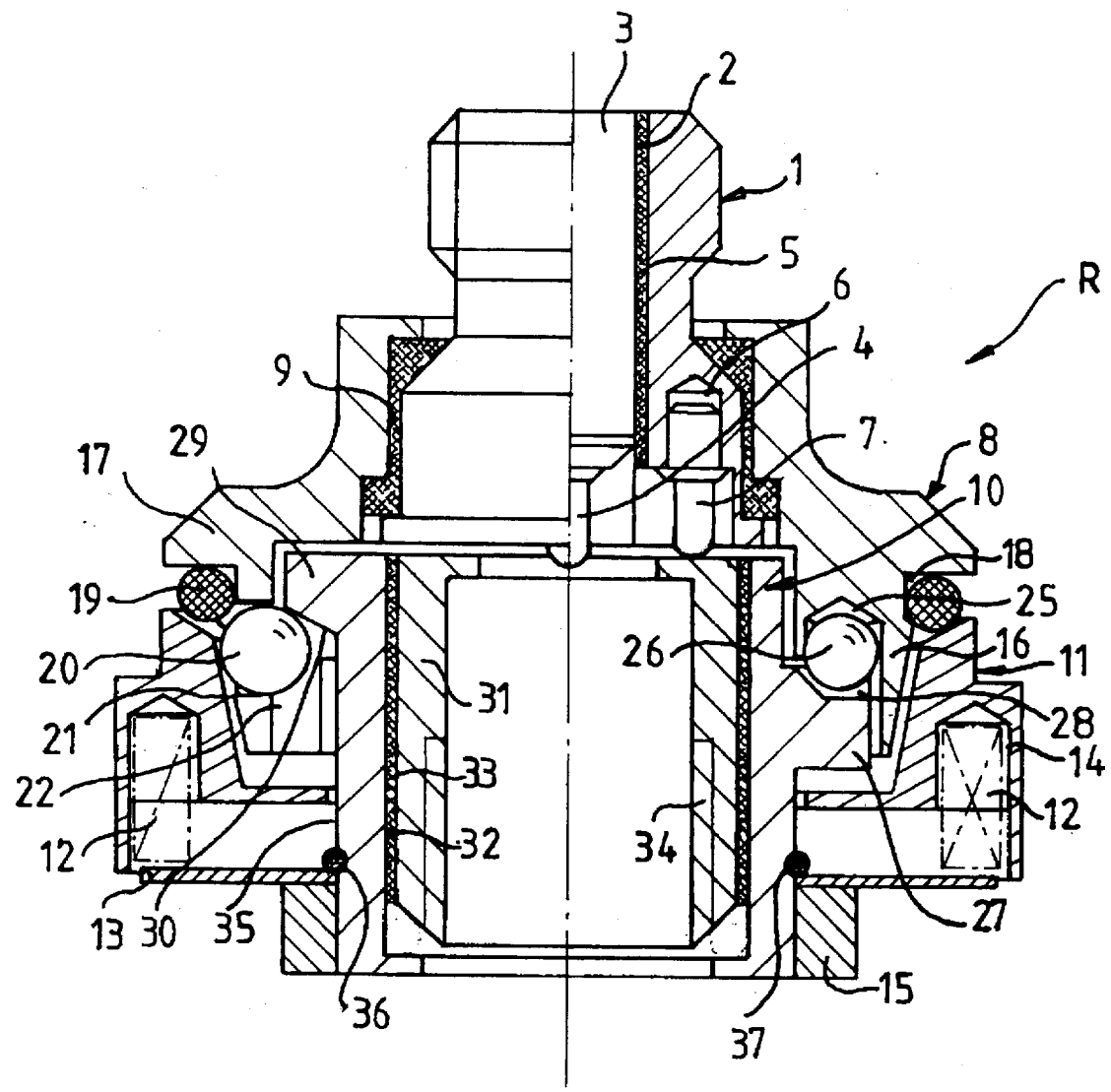

COUPLER FOR USE IN THE SENSOR HEAD OF A MEASURING DEVICE

BACKGROUND OF THE INVENTION

The present invention relates to a coupler for use, for instance, in the sensor head of a measuring device, the coupler having an adapter element being detachably held by a supporting body by means of position fixing means which are acted on by a closure element.

Such a coupler is described, for instance in EP-A 0 562 535, to which reference is expressly had here.

The object of the present invention is further to develop this coupler in such a manner that the passage of current is assured.

In order to achieve this object, a connecting plug through which current flows to a spring pin is provided in an annular space surrounded by a support body. The spring pin yields upon the inserting of the adapter element in the supporting member so that in this way an assured contact is obtained between the connecting plug and the adapter element.

SUMMARY OF THE INVENTION

In order, however, to insulate the connecting plug also on the outside, the annular space between the supporting member and the connecting plug should be filled with an insulating material. For this, an insulating adhesive can preferably be used whereby a fixing of the connecting plug in the supporting member is obtained at the same time.

The necessary second current lead-through takes place preferably via a pin which is inserted in an axial hole in the connecting plug. For the fixing in place of this pin and its insulation from the connecting plug, it is also in this case preferably provided that an annular channel formed in corresponding manner between the pin and the connecting plug be filled with an insulating material, for instance an adhesive. From the pin there preferably extends a further spring pin which, upon insertion of the adapter element, or for instance separately therefrom upon the insertion of a sensor pin, comes into contact with the latter.

The adapter element should preferably also be insulated from the current feed. Therefore there is inserted in the adapter element a sleeve which, in position of use, makes contact with said first spring pin in the connecting plug. Between this sleeve and the adapter element there is again preferably an annular slot which is filled with an insulating material, preferably adhesive.

Since a certain pressure is exerted on the adapter element via the spring pins and, in particular, the first spring pin, an opposing pressure should be provided to give assurance that the adapter element will be held by the position fixing means. This is done by the insertion of an elastic ring into an annular groove in the outer wall of the adapter element. On this elastic ring there presses a ring which at the same time rests peripherally via springs against the closure element. This means that the ring, which in its turn is acted on by pressure by a stop ring, moves both the adapter element and the position fixing means which cooperate with the adapter element.

By this simple development, an assured passage of current is assured by a coupler in accordance with EP-A 0 562 535.

BRIEF DESCRIPTION OF THE DRAWINGS

Further advantages, features and details of the invention will be evident from the following description of preferred embodiments, read with reference to the drawing the sole FIGURE of which is a cross section through a coupler in accordance with the invention.

DETAILED DESCRIPTION

A coupler R in accordance with the invention has a connecting plug 1 on a sensor head (not shown in detail) for a measuring device. The connecting plug 1 is followed by an adapter part which consists of several individual elements. Adjoining this adapter part there is a sensor pin (not shown in detail) intended for instance for the scanning of a workpiece.

The connecting plug 1 has an axial bore 2 in which a pin 3 for the conducting of an electric current to a spring pin 4 is fixed. For insulation between pin 3 and connecting plug 1, an annular channel 5 is filled with an insulating material, in particular an adhesive.

Adjacent the spring pin 4 in a blind hole 6 of the connecting plug 1 there is inserted another spring pin 7, also for the conducting of current.

The connecting plug 1 surrounds in part a supporting member 8, the connecting plug 1 and supporting member 8 forming an annular space 9 which is also filled with insulating material, in particular adhesive.

The elements of the adapter part are the aforementioned supporting member 8, an adapter element 10, a closure element 11 and a ring 13 which rests, via springs 12, against the closure element 11. The springs 12 are seated in blind holes 14 in the closure element 11; the ring 13, on the other hand, rests against a stop ring 15.

An annular wall 16 which has a conical outer contour extends down from the supporting member 8 over an upper part of the adapter element 10. Adjoining this annular wall 16 there is a flange 17, an annular trough 18 being arranged in the annular wall 16 below the flange 17 in order to receive an O-ring 19. This O-ring, in addition to a certain sealing function, also has the function of preventing the falling out of balls 20 which are seated in receiving holes 21 in the annular wall 16. These receiving holes 21 are so shaped that the balls 20 cannot drop into an inner space 22 surrounded by the annular wall 16 since a diameter of the receiving hole 21 towards the inner space 22 is smaller than the diameter towards the outer contour of the annular wall 16. The dropping of the balls 20 out of the receiving hole 21 can not only be avoided by the O-ring 17 but, for instance, an outer edge of the receiving hole 21 could also be embossed after the insertion of the balls 20.

Three balls 20 are preferably arranged distributed symmetrically in the annular wall 16. They serve to hold the adapter element 10 in an inner space 22. An insert element 29, possibly triangular in shape, of the adapter element 10 is inserted into the inner space 22. It has a lower edge having an oblique surface with slopes in particular towards the corners of the triangular insert element 29 and, in position of use, is gripped from below by the balls 20.

Within the annular wall 16 platforms developed as part of a circle and having ball troughs 25 are arranged. One ball 26 is inserted in each ball trough 25, the ball trough 25 being so developed, or embossed after insertion, that the balls 26 cannot fall out of the corresponding ball trough 25. On the adapter element 10 there are developed protrusions 27, a centering trough 28 being developed in each protrusion 27. This centering trough 28 cooperates with the corresponding ball 26.

The entire inner space 20 of the supporting member 5 is then surrounded by a correspondingly irregularly developed edge 27 of the annular wall 14.

In the adapter element 10 there is furthermore arranged a sleeve 31, this sleeve 31 in its turn developing an annular slot 33 with respect to an inner wall 32 of the adapter element 10. This annular slot 33 is also filled with an insulating material, for instance a suitable adhesive.

The sleeve 31 furthermore has an internally threaded section 34 into which an extension sleeve, for instance, can be screwed.

Essential parts of the mechanical manner of operation of the present coupler R of the invention are described in EP-A 0 562 535. Reference is expressly had to said patent, the disclosure there applying also to the present invention.

One difference from EP-A 0 562 535 consists, on the one hand, in the fact that in the present case a ring 13 rests against springs 12, the closure element 11 being caused by the force of the springs 12 to push the balls 20 in. Furthermore, in an outer wall 35 of the adapter element 10 there is preferably developed an annular groove 36 into which an elastic ring 37 is inserted. Upon the pushing on of the stop ring 15 and of the ring 13, the adapter element 10 is thus pushed deep into the inner space 22, so that the ball 20 can pass favorably below the oblique surface 30.

An insulated conducting of a current in a reliable manner is assured by the arrangement selected.

I claim:

1. A coupler for insertion in a sensor head of a measuring device, said coupler having an adapter element detachably held within a support member by position fixing means on a closure element, the improvement comprises said support member having an annular wall which defines an annular space, a connecting plug received in said annular space and having a first spring pin, said connecting plug having a wall defining a space, a pin received in said space and having a second spring pin, a first insulating material provided between said annular wall and said connecting plug and said wall and said pin, respectively.

2. A coupler according to claim 1 wherein the adapter element has an inner wall which defines an opening for receiving a sleeve which contacts the first spring pin wherein a second insulating material is provided between the adapter element and the sleeve.

3. A coupler according to claim 1 wherein a ring surrounds the adapter element and presses against a sealing ring which is inserted into an annular groove on the adapter element.

4. A coupler according to claim 3 wherein the ring rests on springs provided between the ring and the closure element.

5. A coupler according to claim 1 wherein said first insulating material is an adhesive material.

6. A coupler according to claim 2 wherein said second insulating material is an adhesive material.

* * * * *